United States Patent
Yamazaki et al.

(10) Patent No.: US 7,626,655 B2
(45) Date of Patent: Dec. 1, 2009

(54) SURFACE LIGHT SOURCE DEVICE OF SIDE LIGHT TYPE, LIQUID CRYSTAL DISPLAY AND GUIDE PLATE

(75) Inventors: Hiroshi Yamazaki, Saitama (JP); Shingo Ohkawa, Saitama (JP)

(73) Assignees: Enplas Corporation, Kawaguchi-Shi (JP); Yasuhiro Koike, Yokohama-Shi (JP)

( * ) Notice: Subject to any disclaimer, the term of this patent is extended or adjusted under 35 U.S.C. 154(b) by 0 days.

(21) Appl. No.: 09/330,016

(22) Filed: Jun. 11, 1999

(65) Prior Publication Data
US 2003/0231265 A1    Dec. 18, 2003

(30) Foreign Application Priority Data
Jun. 12, 1998    (JP) .............................. 1998-164493

(51) Int. Cl.
*G02F 1/1335* (2006.01)
(52) U.S. Cl. .............................. 349/65; 349/62; 349/64
(58) Field of Classification Search ............. 349/61–65; 362/31–33
See application file for complete search history.

(56) References Cited
U.S. PATENT DOCUMENTS

| | | | | |
|---|---|---|---|---|
| 4,519,686 A | * | 5/1985 | Seki et al. ................... | 354/200 |
| 5,408,388 A | * | 4/1995 | Kobayashi et al. ............ | 362/31 |
| 5,771,328 A | * | 6/1998 | Wortman et al. ............. | 385/146 |
| 5,856,855 A | * | 1/1999 | Mol et al. ..................... | 349/65 |
| 5,863,113 A | * | 1/1999 | Oe et al. ....................... | 362/31 |
| 5,886,759 A | * | 3/1999 | Mashino et al. .............. | 349/65 |
| 5,887,964 A | * | 3/1999 | Higuchi et al. ................ | 349/65 |
| 6,027,221 A | * | 2/2000 | Ishikawa et al. .............. | 362/31 |
| 6,339,458 B1 | * | 1/2002 | Ohkawa ........................ | 349/65 |

* cited by examiner

*Primary Examiner*—Dung T. Nguyen
(74) *Attorney, Agent, or Firm*—Staas & Halsey LLP (57) ABSTRACT

A surface light source device of side light type illuminating an LCD panel and comprising a guide plate, a primary light source, a reflection sheet, and a prism sheet for light control. A plurality of fine light scattering elements and rough area M are formed on an emission face of the guide plate. The rough area M is formed among the light scattering elements and has scattering power weaker than that of the light scattering elements. The dot-like light scattering elements are distributed according to a certain pattern that is designed to promote emission. Emission is promoted where the light scattering elements are formed and also in the area M. Accordingly, fine periodic bright-dark unevenness and glaring are reduced and the prism sheet, disposed on the emission face, is prevented from sticking to the emission face.

11 Claims, 6 Drawing Sheets

SURFACE LIGHT SOURCE DEVICE OF SIDE LIGHT TYPE, LIQUID CRYSTAL DISPLAY AND GUIDE PLATE

BACKGROUND

1. Field of Invention

The present invention relates to a surface light source device of side light type, a liquid crystal display (LCD) and a guide plate used for the devices, in particular, to the guide plate having an incidence end face, an emission face and back face provided by a minor face and two major faces, respectively, as well as to the devices with improved illumination characteristics or display characteristics by employing the improved guide plate.

2. Related Art

It is well known to employ a surface light source device of side light type for illuminating a LCD panel of a LCD. In general, the surface light source device of side light type comprises a guide plate and a primary light source such as rod-like light source, the primary light source being disposed along an incidence end face of the guide plate. Such arrangement has an advantage that the arrangement can be applied to LCDs without increase in overall size.

Primary light emitted from the primary light source is introduced into the guide plate through the incidence end face. As well known, the guide plate deflects the light through processes such as reflection, scattering or the like, thereby causing the light to be emitted from an emission face which is provided by a major face. Thus emitted light is supplied to the LCD panel through an additional member such as prism sheet.

Two types of guide plates are known. One of the two types is featured by substantially overall uniform thickness and the other is featured by thickness which tends to decrease according to distance from the incidence end face. Generally saying, guide plates of the latter type can emit illumination light more effectively as compared with ones of the former type.

Light scattering pattern is formed on the emission face of the guide plate to adjust brightness distribution by promoting emission therefrom. The light scattering pattern consists of, for example, a great number of light scattering elements arranged according to a certain arrangement rule. The light scattering elements are provided by, for example, a great number of rough local regions formed by processes such as mat-processing or ink deposition.

As well known, the emission face of the guide plate emits light preferentially toward oblique directions inclined forward (namely, as to be away from the incidence end face). This property is called "emission directivity".

A prism sheet is disposed along the emission face as a light control member in order to correct this directivity. The prism sheet is an optical member at least one surface of which provides a prismatic surface, being made of light permeable material such as polycarbonate or polyethylene terephthalate. As well known, thus disposed prism sheet causes the emission light to be subject to refraction and inner reflection effect of the prismatic surface, correcting the inclined preferential direction of the emitted light. Such prior art suffers from problem as follows.

If size of the light scattering elements forming light scattering pattern is designed so that brightness is uniform over the emission face, the light scattering elements are hard to be almost invisible to the naked eye. In general, such area as tending to be short of brightness requires light scattering elements formed therein to have a large size. Such large-sized light scattering elements are naturally easy to be visible. Easily visible light scattering elements bring fine bright-dark unevenness to the emission face.

As a result, surface light source devices of side light type employing such guide plates with bright-dark unevenness suffer from reduction in quality (smoothness) of illumination output. In other words, brightness distribution involves rise in high spatial frequency component. And needless to say, LCDs in which such surface light source devices of side light type for backlighting are incorporated suffer from reduction in display quality.

It has been proposed to adjust distribution density of light scattering elements in order to avoid this problem (Japanese Patent Application 228, 852/1997). According the proposed technique, distribution density of light scattering elements is adjusted so as to make emission intensity distribution (brightness distribution) flat under a size condition such that each light scattering element is hard to be visible.

Distribution density is defined as number of light scattering elements allotted and arranged per unit area. Density of light scattering element arrangement is high in an area in which intensive promotion of emission is required while it is low in a portion where weak promotion of emission is required. Such technique realizes improvement in quality of illumination output.

However, the above proposed technique suffers from a unsolved problem. That is, although size of light scattering elements is small, emission promotion property is greatly different between regions (i.e. a set consisting of fine regions) occupied by the light scattering elements and the other region (i.e. a region corresponding to complementary set with respect to the set consisting of the fine regions) without the light scattering elements.

This difference is observed as bright-dark unevenness although it is very fine. It looks some times like a periodic variation of emission intensity which is generated depending on periodicity of the light scattering element arrangement. Such bright-dark unevenness or periodic variation is still a factor of reduction in quality of the emission face's looks or illumination output therefrom, being required to be restrained.

Figure 9:
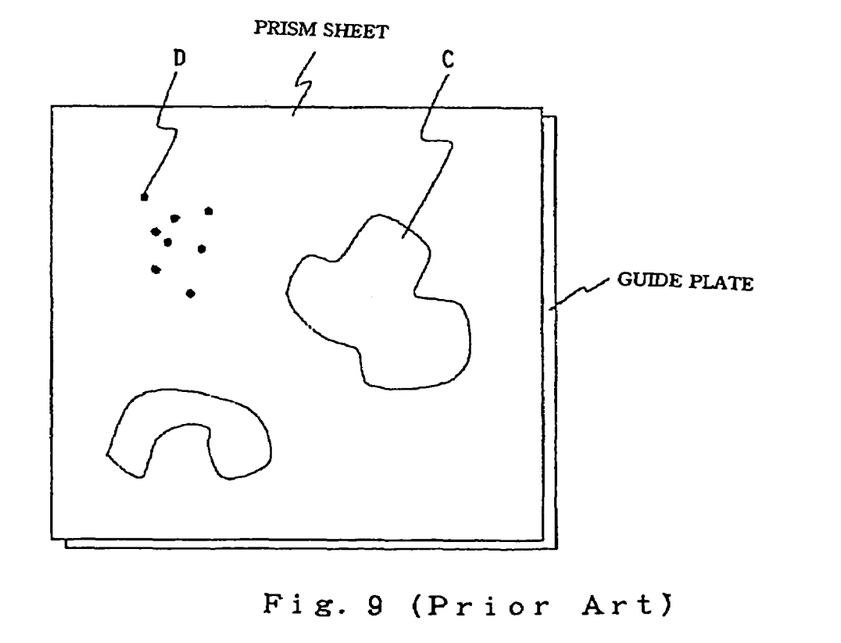
FIG. 9 is a plan view diagram to illustrate sticking of a prism sheet.

Besides, the above prior arts and proposed technique are apt to be affected by sticking of prism sheet. FIG. 9 is a diagram to give an explain on this problem.

As previously described, a prism sheet is disposed directly on an emission face of a guide plate in many cases. Thus disposed prism sheet tends to partially stick to the emission face. Such sticking produces bright-dark pattern on an output face (i.e. an outer face of the most outside additional member), as shown in FIG. 9, thereby reducing quality of illumination output.

Pattern C like islands and pattern D like dots are exemplarily illustrated in FIG. 9. Pattern C will appear when a rather large local area sticks to the emission face while pattern D will appear when a small local area sticks to the emission face.

Further attention should be paid to another problem which is derivatively generated from such sticking of prism sheet. That is, operation efficiency of assembling of surface light source device of side light type or LCD could be reduced. In particular, when any foreign body such as trash is interposed between a guide plate and a prism sheet, troublesome operations are required for removing the foreign body. If the prism sheet were free from sticking, the foreign body could be removed by rather simple operations.

OBJECT AND SUMMARY OF INVENTION

The present invention is proposed under the above-described background. An object of the present invention is to provide a surface light source device of side light type improved so that fine bright-dark unevenness is prevented from being caused by difference in characteristics between regions occupied by light scattering elements distributed on an emission face of a guide plate and the other region among the light scattering elements and to provide a liquid crystal display to which the improved surface light source device is applied as well as a guide plate which brings the improvement to the devices.

Another object of the present invention is to provide a surface light source device of side light type improved so that a guide plate disposed directly on an emission face of a guide plate is free from sticking to the emission face and to provide a liquid crystal display to which this improved surface light source device is applied as well as a guide plate which brings this improvement to the devices.

The present invention can be applied to a surface light source device of side light type comprising a guide plate having a minor face to provide an incidence end face and two major faces to provide an emission face and a back face as well as a primary light source arranged so that the guide plate is supplied with primary light through the incidence end face and can be applied also to a liquid crystal display employing the surface light source device for backlighting of a liquid crystal display panel. And the present invention improves a guide plate employed in the devices.

According to a feature of the present invention, an emission face of a guide plate is provided with a great number of light scattering elements distributed in accordance with a predetermined pattern and is provided with a rough area formed among the light scattering elements, wherein the rough area has roughness smaller than that of the light scattering elements.

Such a rough area formed among the light scattering elements enables a prism sheet to reduce tendency of sticking thereto. Accordingly, the prism sheet, if directly disposed on the emission face, is prevented from sticking.

The rough area has roughness preferably falling in a range from 0.02 μm to 0.25 μm in arithmetic mean roughness. And the light scattering elements have sizes preferably such that they are hard to be visible to the naked eye. At least one of the emission and back faces of the guide plate may be provided with a great number of projection rows running approximately at right angles with respect to the incidence end face. The projection rows correct directivity regarding in a plane in parallel with the incidence end face so that emission is gathered around a frontal direction.

The above-described and the other features will be understood in more detail from the following description with referring to the accompanied drawings.

BRIEF DESCRIPTION OF DRAWINGS

FIG. 3b is an enlarged partial view illustrating light scattering elements around a corner portion of the emission face of FIG. 3a;

FIG. 3c is an enlarged partial view illustrating light scattering elements around a distal portion of the emission face of FIG. 3a;

EMBODIMENT

(1) Embodiment

Figures 1A, 1B, 1C:
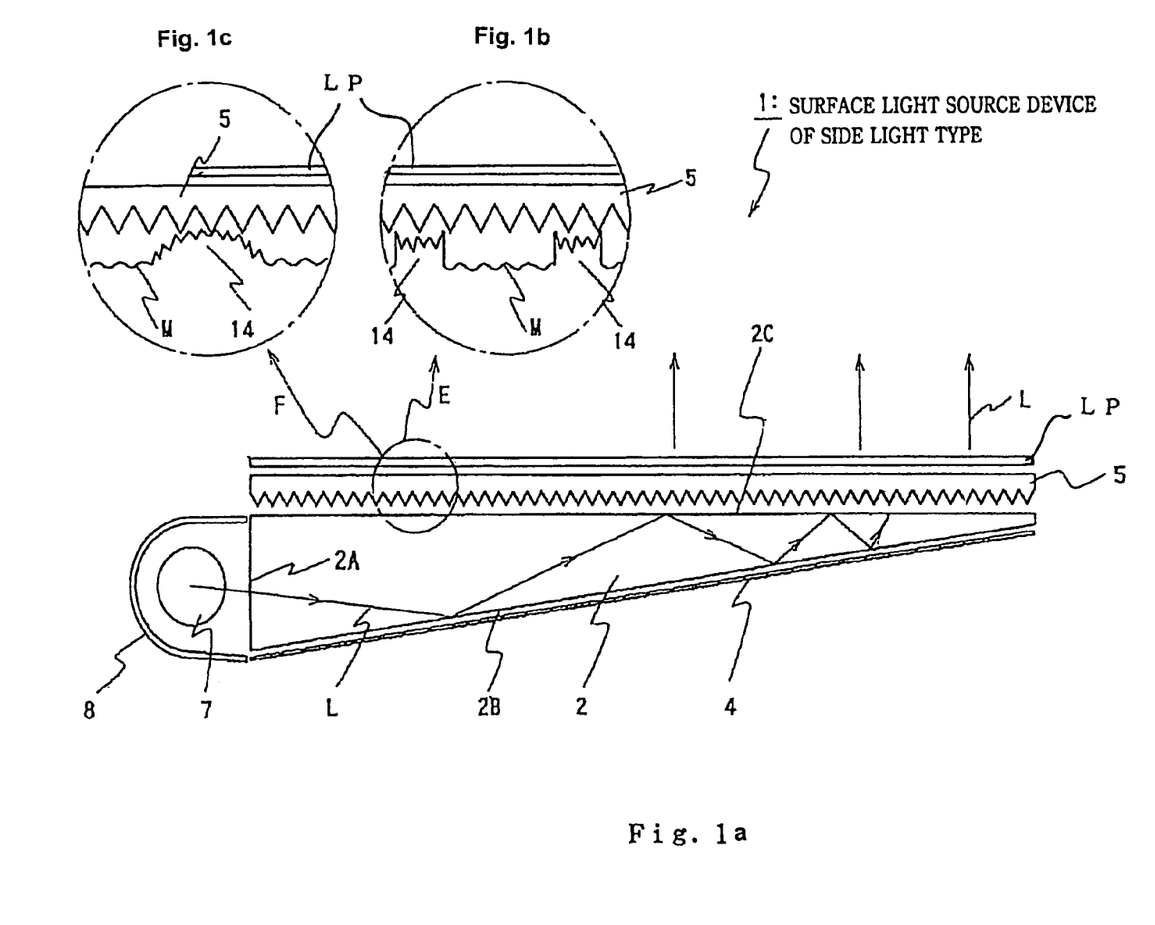
FIG. 1a is a cross section illustrating a surface light source device of side light type in accordance with an embodiment of the present invention.
FIG. 1b is an enlarged partial view illustrating an example of a light scattering element and a rough area of the present invention.
FIG. 1c is an enlarged partial view illustrating another example of a light scattering element and a rough area of the present invention.
Figures 2A, 2B, 2C:
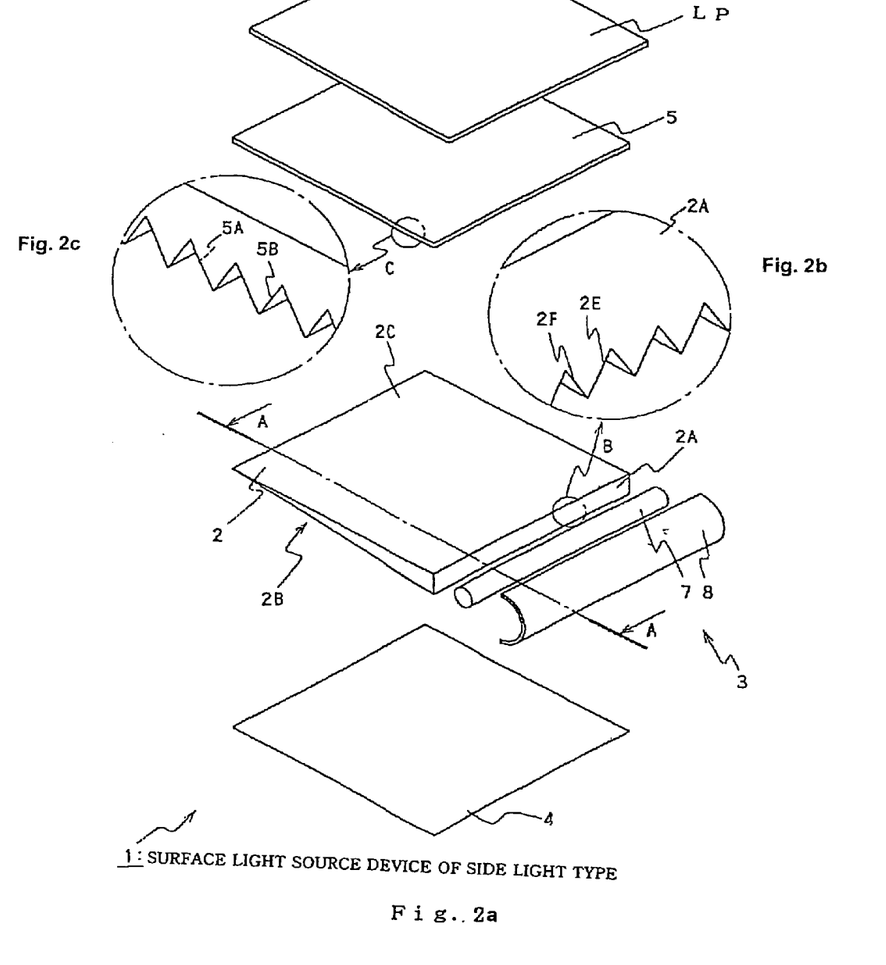
FIG. 2a is an exploded perspective view of the surface light source device shown in FIGS. 1a to 1c.
FIG. 2b is an enlarged partial view illustrating fine projection rows on a back face of a scattering guide plate of the present invention.
FIG. 2c is an enlarged partial view illustrating fine projection rows on a back face of a prismatic surface of a prism sheet of the present invention.

Referring to FIGS. 1a and 2c, a surface light source device of side light type 1 comprises a scattering guide plate 2, a primary light source 3, a reflection sheet 4 and a flexible prism sheet 5 as a light control member. The reflection sheet 4, the scattering guide plate 2 and the prism sheet 5 are laminatedly arranged. The scattering guide plate 2 has a wedge-like cross section with a thicker end portion having a minor face to provide an incidence end face 2A beside which the primary light source is disposed.

The primary light source 3 is, for example, provided by a cold cathode lamp (fluorescent lamp) 7 backed by a reflector 8. The fluorescent lamp) 7 emits illumination light (primary light) which is supplied to the incidence end face 2A of the scattering guide plate 2 through an opening of the reflector 8. The reflector is a sheet-like member with regular or irregular reflectivity.

The reflection sheet 4 is, for example, a sheet-like member with regular reflectivity provided by evaporation-deposited silver or a sheet-like member such as white PET film. A major face 2C of the scattering guide plate 2 provides an emission face while the other major face 2B provides a back face. Although some light leaks through the back face 2B, the reflection sheet 4 reflects and returns the leaked light to the scattering guide plate 2. This prevents loss in light energy.

The scattering guide plate 2 is made of a material provided with inner scattering power. The material consists of, for example, matrix made of polymethyl methacrylate (PMMA) and light permeable "different-refractive-index fine particles" uniformly dispersed in the matrix. The term, "different-refractive-index fine particle" is defined as a fine particle having a refractive index different from that of the matrix.

On lighting of the fluorescent lamp 7, illumination light L is introduced into the scattering guide plate 2 through the incidence end face 2A. This illumination light L propagates to approach a distal end of the scattering guide plate 2 with repeated reflections at the back face 2B and the emission face 2C. Reflections at the back face 2B and the emission face 2C involve partial emission to the outside of the scattering guide plate 2. As described later in detail, the back face 2B is provided with emission promoting function according to a feature of the present invention.

Light escaped from the back face 2B is returned to the scattering guide plate 2 directly or via the reflection sheet 4. Emission from the emission face 2C is inclined forward (to the distal end) because of the forementioned emission directivity. returned to the scattering guide plate 2 directly or via the reflection sheet 4. This inclined directivity is modified by the prism sheet 5 to be supplied to a LCD panel LP.

Illumination light L emitted from the emission face 2C is introduced into the prism sheet 5 through a slope 5B, shown in FIG. 2c indicated with arrow C, relatively near to the incidence end face 2A and is reflected at another slope 5A, shown in FIG. 2c indicated with arrow C, relatively far from the incidence end face 2A to be outputted to a frontal direction of the emission face 2C (upward in FIG. 1a). Thus the prism sheet 5 corrects directively of emission to a frontal direction of the emission face 2C regarding in a plane perpendicular to the incidence end face 2A.

In the present embodiment, each pair of slopes 5A, 5B has an equal inclination angle with respect to the emission face 2C. A practical range of prismatic vertical angle is from 30 to 70 degrees. It is to be noted that the projection rows may have cross section of various symmetric or asymmetric shapes depending on required characteristics.

On the other hand, referring to FIG. 2b indicated with arrow B, the back face 2B of the scattering guide plate 2 is also provided with a great number of fine projection rows. These projection rows run approximately at a right angle with respect to the incidence end face 2A. Each of the projection rows includes a pair of slopes 2E, 2F running approximately at a right angle with respect to the incidence end face 2A.

In the present embodiment, each pair of slopes 2E, 2F are connected directly to each other to give a triangular cross section. These projection rows correct directivity of emission to a frontal direction (normal direction) of the emission face 2C regarding in a plane parallel to the incidence end face 2A.

And a good efficiency is given to emission from emission face 2C. The reason is as follows. When illumination light propagating within the scattering guide plate 2 inner-impinges to the back face 2B, the light is reflected by either a slope 2E or 2F. Propagation directions of light inner-reflected by the back face (slopes 2E, 2F) gather better around a frontal direction regarding in a plane parallel to the incidence end face 2A as compared with cases where the back face is flat (without slopes 2E, 2F). As a result, an increased output component to a normal direction with respect to the emission face 2C is obtained.

It should be noted that some of the inner incident light to the back face 2B becomes such illumination light L as impinging onto the slope 2F (or 2E) at small angles which allow the impinging light to be escaped out of the scattering guide plate 2 through the slope 2F (or 2E).

Such escaping light is returned and introduced again into the scattering guide plate 2 through a slope 2E (or 2F) of a projection row, being led to the slope 2F (or 2E) of the projection row to be directed toward the emission face 2C.

Since such illumination light has small inner incidence angles with respect to the emission face 2C, emission from the emission face 2C occurs easily. Although some component is returned into the scattering guide plate 2 via the reflection sheet 4, such component is also directed toward the emission face 2C.

In the present embodiment, each pair of slopes 2E, 2F has an equal inclination angle with respect to the emission face 2C. A practical range of prismatic vertical angle is from 50 to 130 degrees. It is to be noted that these projection rows may have cross section of various symmetric or asymmetric shapes depending on required characteristics.

Figure 3A:
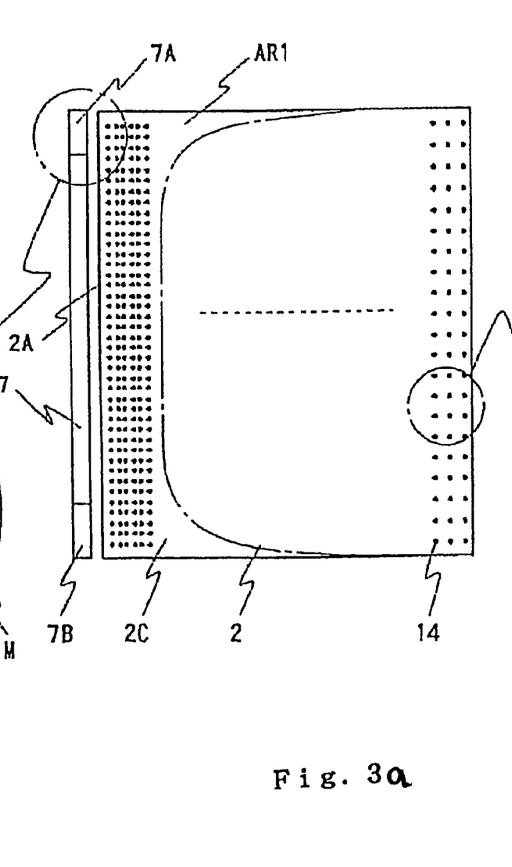
FIG. 3a is a plan view of an emission face of a scattering guide plate employed in the surface light source device shown in FIGS. 1a to 1c.

Next, attention should be paid to scattering pattern (arrangement of light scattering elements) and rough area which are provided on the emission face 2C according to a most important feature of the present invention. Referring to FIGS. 3 and 4, a great number of fine scattering elements 14 are provided on the emission face 2C with rough area M spreading among the scattering elements 14.

In the illustrated embodiment, the light scattering elements 14 are locally formed fine rough regions. It is to be noted that the rough area M has scattering power which is smaller that that of the light scattering elements 14. That is, as shown in FIGS. 1b and 1c with indications of E and F, degree of roughness is lower in the area M than in the fine rough regions corresponding to the light scattering elements 14.

The scattering elements 14 are formed, for example, by applying mat-processing to the emission face so that circular (dot-like) roughened portions are formed therein. Dot size is small enough to be almost invisible when observation is done from above the emission face 2C. In the present embodiment, dot size is 35 µm in diameter.

The scattering elements 14 are distributed according to a predetermined pattern. This pattern is designed depending on degree of emission promoting power required. In areas with a great necessity, namely, in areas where brightness tends to be reduced, a high covering rate is given to avoid brightness reduction. It is to be noted that covering rate can be defined as number of scattering elements per unit area when they have the same size.

Figure 3B:
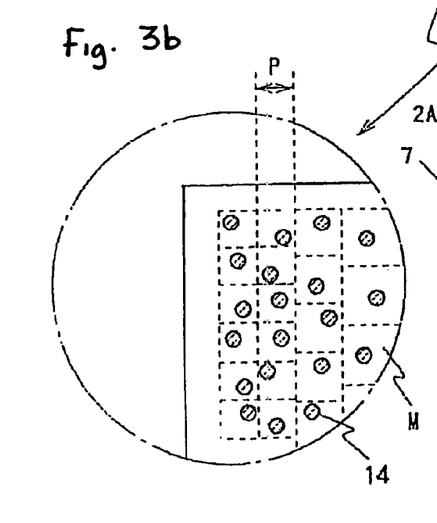
Figure 3C:
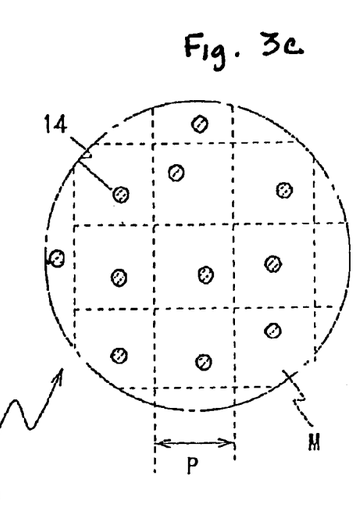
Figure 4:
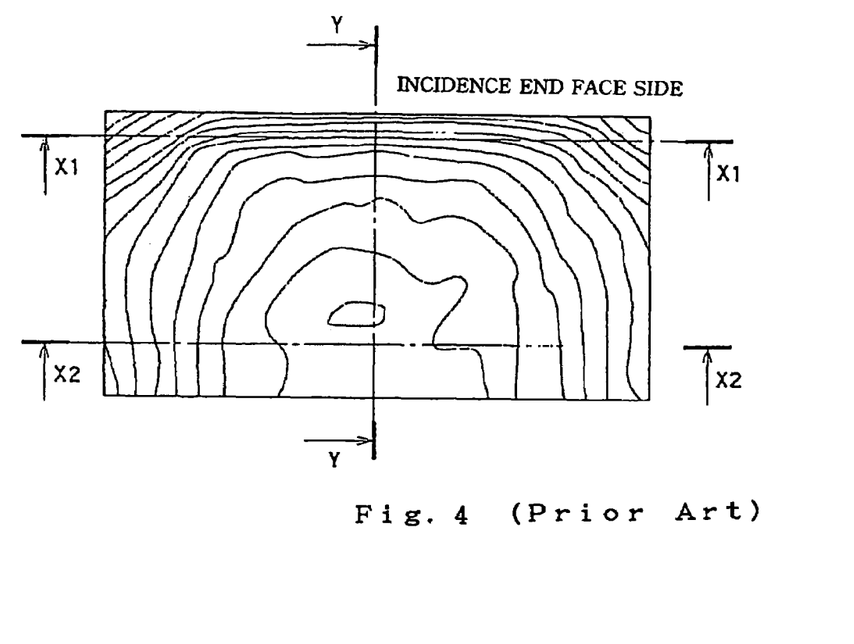
FIG. 4 is a plan view diagram showing distribution of emission intensity which is measured under a condition such that no scattering pattern is formed on an emission face.

In the present embodiment, number of scattering elements per unit area (i.e., covering rate) is increased in an area indicated by reference symbol AR1, as understood by comparing a partially enlarged illustration of FIG. 3b with another partially enlarged illustration of FIG. 3c. That is, the light scattering elements 14 are distributed at a relatively large density in corner portions corresponding to electrodes 7A, 7B of the fluorescent lamp 7 and in tapering areas extending therefrom respectively.

According to a design technique, brightness distribution of a scattering guide plate provided with no scattering element 14 is measured. An example of such measurement is shown in diagram of FIG. 4. In the diagram, distribution of light intensity (i. e. brightness) is depicted by means of iso-brightness curve with 200 cd/mm$^2$ pitch. Distribution of scattering elements 14 is determined depending on such a result of measurement.

Figure 5:
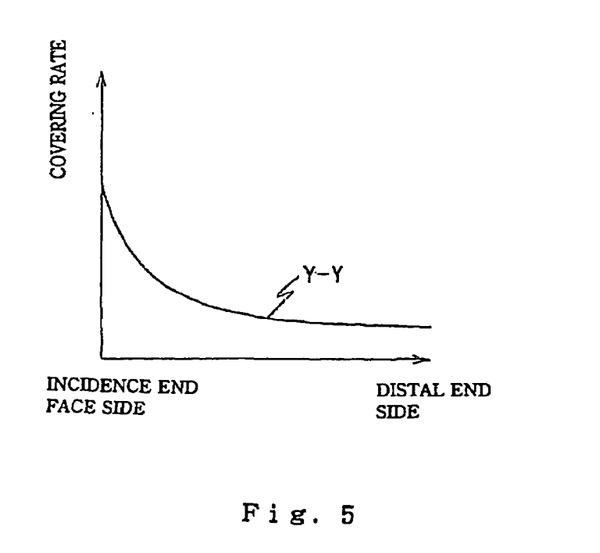
FIG. 5 is a diagram showing variation of covering rate in the embodiment.

First, covering rate is set on a center line Y-Y in FIG. 4 which is perpendicular to the incidence end face 2A. Thus set covering rate is shown in FIG. 5 exemplarily. A covering rate curve illustrated in FIG. 5 has been determined so that brightness is made constant along the center line Y-Y.

Next, pitch P is calculated under a provisional condition such that scattering elements 14 are distributed to form a matrix-like arrangement in accordance with the covering rate curve. Rectangular boxes are provisionally set over the emission face 2C according to the calculated pitch P.

Figure 6:
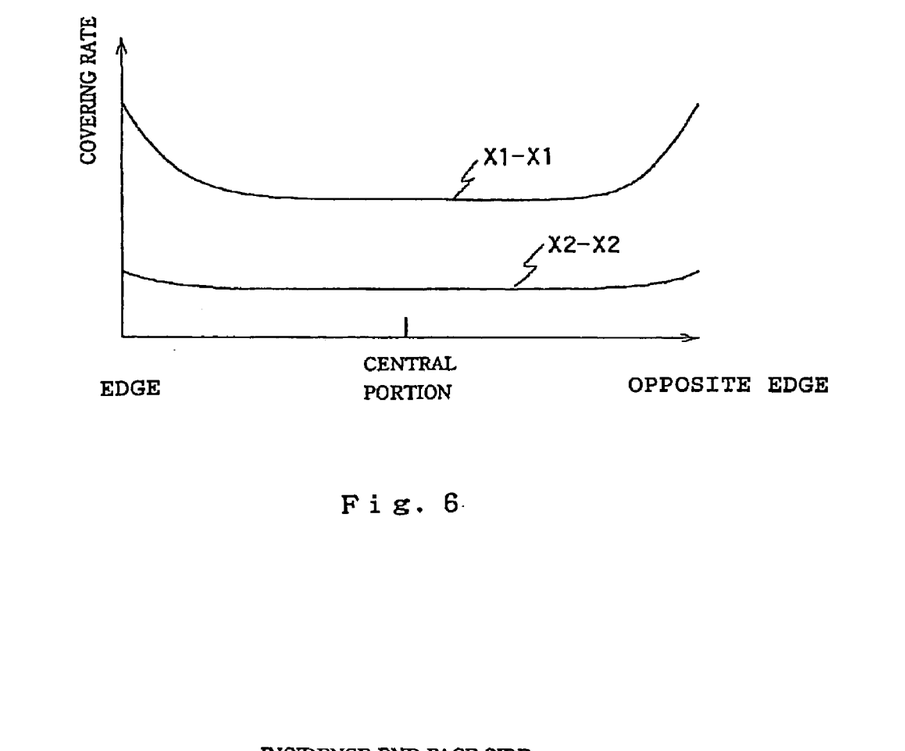
FIG. 6 is a diagram showing variation of covering rate along a direction parallel to an incidence end face in the embodiment.

Further, covering rate is set on imaginary lines X1-X1 and X2-X2 which are parallel to the incidence end face 2A. Thus set covering rate is shown in FIG. 6 exemplarily. Covering rate curves illustrated in FIG. 6 have been determined so that brightness is made constant along the imaginary lines X1-X1 and X2-X2, respectively.

The covering rate curves shown in FIG. 6 are used for correcting the provisionally set boxes. That is, pitch P is corrected with reference to a direction parallel to the incidence end face 2A according to covering rate variation depicted in FIG. 6. This correction increases covering rate around side edge portions where brightness might tend to be insufficient.

An example of thus determined boxes are illustrated in FIGS. 3a to 3c with dotted lines. One scattering element 14 is allotted one box. Position in each box is preferably random. Such random positioning prevents Moire fringes which might be caused by overlapping relation with pixels of the LCD panel. However, so far as Moire fringes are tolerable, an arrangement with regularity may be employed.

In the example shown in FIGS. 3a to 3c, pitch P is adjusted so that reduction for correction with respect to the provisionally set value is increasing in the area AR1 according to being closer to the incidence end face and also to being closer to the corners along the incidence end face 2A.

Figure 7:
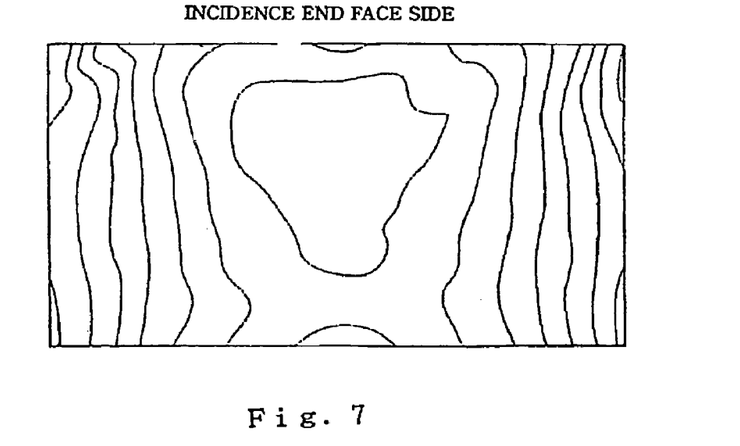
FIG. 7 is a plan view diagram to illustrate correction of distribution of emission intensity by means of a scattering pattern.

FIG. 7 shows an example of improved brightness distribution obtained under thus determined light scattering pattern. Distribution of light intensity (i. e. brightness) is depicted by means of iso-brightness curve with 200 cd/mm$^2$ pitch in the diagram, too. As compared with the forementioned diagram of FIG. 4, intervals among iso-brightness curves are greater and number of the iso-brightness curves are decreased. It is understood from this that a uniformized brightness distribution is realized.

Light scattering elements 14 are not limited by the present embodiment so far as they can promote emission from the emission face 2C. However, if they are required to be invisible at observation from above the emission face 2C, element sizes (dot sizes) should not be greater than 80 μm. In general, element sizes are preferably 50 μm or less, in particular, 25 μm or less.

Examples of cross section shapes of light scattering elements 14 for uniformizing brightness by promoting emission of illumination light are shown in circled illustrations in FIG. 1 with reference symbols E, F. An example with reference symbol E illustrates a column-like protuberance and another example with reference symbol F illustrates a dome-like protuberance. Height of the protuberances fall in the range of 0.5 μm to 4 μm. Surfaces of the light scattering elements 14 are roughened to an extent such that such shapes are not lost.

Inner surface of a mold employed for producing the scattering guide plate 2 is locally roughened for forming the light scattering elements 14. The positions of being roughened correspond to the forming positions of the light scattering elements 14.

This roughening process is followed by another roughening process for roughening the whole inner surface portion of the mold corresponding to the emission face 2C to form a rough surface over the area M among the light scattering elements 14. Roughness of the area M is preferably in a rang of 0.02 to 0.25 μm in arithmetic mean roughness Ra. Arithmetic mean roughness Ra is defined in JISB0031-1994.

Processing for roughening may be selected, without a particular concrete limitation, according to design in view of the objects of the present invention. For example, some kinds of processing such as blasting, etching or electric discharge machining may be employed for roughening.

As previously mentioned, illumination light L introduced into the scattering guide plate 2 through the incidence end face 2A propagates to approach the distal end of the scattering guide plate 2 with repeated reflections at the back face 2B and the emission face 2C. Reflections at the back face 2B and the emission face 2C involve partial emission to the outside of the scattering guide plate 2.

Needless to say, scattering power of the light scattering elements 14 and the area M promotes emission from the emission face 2C. It is important that emission is promoted not only in the portions provided with light scattering elements 14 but also in the area M among them. As mentioned in RELATED ART, prior arts give no emission promoting power to regions where no light scattering element 14 is formed. As a result, fine pulsative bright-dark unevenness is produced, providing looking of unsmoothness.

Since this embodiment in accordance with the present invention gives emission promoting power to regions where no light scattering element 14 is formed too, such bright-dark unevenness and looking of unsmoothness hardly occur.

Another point to be noted is that an additional member disposed directly on the emission face 2C is reduced in tendency of sticking to the emission face 2C because roughness is imparted to the regions where no light scattering element 14 is formed. Accordingly, the prism sheet 5, disposed directly on the emission face 2C, would hardly occur sticking.

Attention should be paid to that emission directivity is reduced when the area M is provided with strong scattering power. According to a test measurement, arithmetic mean roughness not less than 0.3 μm reduces emission intensity toward the frontal direction by 10% or more as compared with cases where the rough area M is not formed. And, the area M with arithmetic mean roughness not greater than 0.02 μm fails to provide a function enough to prevent the prism sheet 5 from sticking.

The forementioned range of 0.02 to 0.25 μm is a practical range which is set in view of such situation. Further, a preferable lower limit obtained from various tests is Ra=0.05 μm, and a more preferable lower limit is 0.09 μm.

(2) Modifications

None of the above-described embodiment aims to be limitative for the scope of the present invention. For instance, the following modifications are allowed.

(a) The processes for making the mold employed in the above-described embodiment may be substituted by other processes such as the following (i) or (ii).

(i) Roughening for making rough area M is applied to the whole surface of the mold, being followed by local roughening applied for forming light scattering elements 14.

Figure 8:
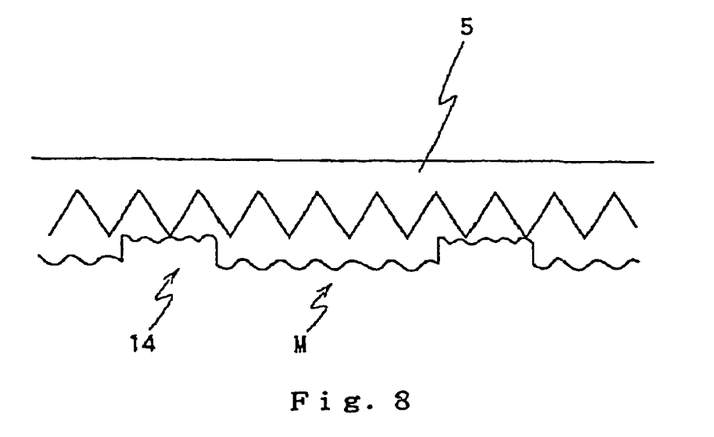
FIG. 8 is a cross section illustrating a surface light source device of side light type in accordance with another embodiment of the present invention.

(ii) Processing by means of etcher liquid such as acid is applied to at least local portions corresponding to the light scattering elements to be formed. FIG. 8 is a cross section illustrating an emission face of a scattering guide plate with a prism sheet 5, the guide plate being produced by means of a mold which is prepared through such kinds of processing.

As illustrated in FIG. 8, such etching liquid processing can produce light scattering elements having microscopically smoother top portions as compared with cases where other kinds of processing are employed. This helps the projections of the prism sheet 5 avoid from being damaged by the light scattering elements 14. Etcher liquid processing may be applied to portions corresponding the area M as well.

(b) In the above embodiment, processing is directly applied to the mold for forming light scattering elements (light scattering pattern and rough surface. This is, however, not limitative for the scope of the present invention and accordingly various other techniques may be employed.

For example, an object having a surface shape corresponding to the light scattering pattern and the rough area may be prepared to produce a mold so that the surface shape is duplicated onto the mold.

Alternatively, either the rough area or the light scattering pattern may be formed by means of a mold and then the other (either the light scattering pattern or the rough area) may be formed on an emission face of a guide plate (a molded product taken out of the mold) without using mold.

According to another employable technique, both of the rough area and the light scattering pattern may be formed through direct processing (with no mold) applied to an emission face of a guide plate.

(c) In the above embodiment, the rough area is formed so that it occupies the whole area except the light scattering elements. In other words, the emission face is occupied overall either the rough area or the light scattering pattern. This is, however, not limitative for the present invention.

That is, the rough area does not necessarily have to occupy the whole area except the light scattering elements so far as difference in characteristics (difference in emission promoting power) between the regions occupied by the light scattering elements and the other region can be reduced as a whole.

(d) Light scattering elements and/or rough area may be formed by applying indirect roughening to an emission face. For instance, ink deposition to roughen the emission face indirectly may be employed for forming the light scattering elements and/or rough area.

(e) In the above embodiment, projection rows are formed on the back face of the guide plate to provide a light control face. This is, however, not limitative for the present invention. For instance, the back face may be a flat face with no projection rows.

(f) In the above-described embodiment, a scattering guide plate provided with scattering power inside is employed as a guide plate with light scattering elements. This is, however, not limitative for the present invention. For instance, a guide plate made of transparent material having substantially no scattering power inside may be employed.

(g) In the above-described embodiment, a scattering guide plate provided with scattering power inside is employed as a guide plate with light scattering elements. This is, however, not limitative for the present invention. For instance, a guide plate made of transparent material having substantially no scattering power inside may be employed.

(g) In the above embodiment, the individual light scattering elements are circular. However, this imposes no limitation on the present invention. That is, various shapes other than circle are employable.

(h) In the above embodiment, the individual light scattering elements have sizes of 80 μm or less. However, this imposes no limitation on the present invention. For example, in a case where the light scattering elements are able to be less conspicuous by a light diffusible sheet with weak scattering power disposed additionally, sizes greater than 80 μm are employable.

(i) An additional member other than prism sheet as employed in the above embodiment, for example, a light diffusible sheet with function as mentioned above may be disposed directly on an emission face. Further, arrangement with no additional member is not out of the scope of the present invention. On the other hand, the present invention allows a plurality of additional members, such as a prism sheet and a light diffusible sheet, to be disposed together.

(j) A guide plate with a cross section other than wedge-shaped may be employed. For instance, a guide plate having uniform thickness overall is employable.

(k) A primary light source provided with an array of point-like light source elements such as LEDs may be employed. Further, light supply to a guide plate may be effected through a plurality of end faces (minor faces).

(l) The present invention may be applied to surface light source devices of side light type which are directed to uses other than backlighting of LCD. For instance, The present invention permits surface light source devices of side light type to be broadly applied; for example, the present invention may be applied to those incorporated in various illumination devices or display devices.

What is claimed is:

1. A surface light source device of side light type comprising:
    a guide plate having a minor face to provide an incidence end face and two major faces to provide an emission face and a back face such that a first edge of the incidence end face abuts a first edge of the emission face along a first direction and the emission face has two substantially parallel edges extending away from the incidence end face in a second direction; and
    a primary light source providing primary light to the guide plate through the incidence end face, wherein
    said emission face is provided with a plurality of light scattering elements distributed according to a predetermined pattern such that a covering density of said light scattering elements on the emission face decreases along the first direction according to a distance from each of the two substantially parallel edges,
    said emission face having a rough area formed on and around said light scattering elements such that the light scattering elements and an area surrounding the light scattering elements are roughened, and
    said rough area having a roughness degree which is less than that of said light scattering elements.

2. A surface light source device of side light type in accordance with claim 1, wherein said rough area has roughness falling in a range from 0.02 to 0.25 μm in arithmetic mean roughness.

3. A surface light source device of side light type in accordance with claim 1, wherein said light scattering elements have sizes such that the light scattering elements are hard to be visible to the naked eye.

4. A liquid crystal display including a liquid crystal display panel and a surface light source device of side light type for backlighting the liquid crystal display panel, said surface light source device comprising:
    a guide plate having a minor face to provide an incidence end face and two major faces to provide an emission face and a back face such that a first edge of the incidence end face abuts a first edge of the emission face along a first direction and the emission face has two substantially parallel edges extending away from the incidence end face in a second direction; and
    a primary light source providing primary light to the guide plate through the incidence end face, wherein
    said emission face is provided with a plurality of light scattering elements distributed according to a predetermined pattern such that a covering density of said light scattering elements on the emission face decreases along the first direction according to a distance from each of the two substantially parallel edges, said emission face having a rough area formed on and around said light scattering elements such that the light scattering elements and an area surrounding the light scattering elements are roughened, and said rough area having a roughness degree which is less than that of said light scattering elements.

5. A liquid crystal display in accordance with claim 4, wherein said rough area has roughness falling in a range from 0.02 to 0.25 μm in arithmetic mean roughness.

6. A liquid crystal display in accordance with claim 4, wherein said light scattering elements have sizes such that the light scattering elements are hard to be visible to the naked eye.

7. A guide plate of a surface light source device of side light type, comprising:

a minor face to provide an incidence end face for introducing light into the guide plate; and two major faces to provide an emission face for emitting light and a back face opposite said emission face such that a first edge of the incidence end face abuts a first edge of the emission face along a first direction and the emission face has two substantially parallel edges extending away from the incidence end face in a second direction, wherein said emission face is provided with a plurality of light scattering elements distributed according to a predetermined pattern such that a covering density of said light scattering elements on the emission face decreases along the first direction according to a distance from each of the two substantially parallel edges, said emission face having a rough area formed on and around said light scattering elements such that the light scattering elements and an area surrounding the light scattering elements are roughened, and said rough area having a roughness degree which is less than that of said light scattering elements.

8. A guide plate in accordance with claim 7, wherein said rough area has roughness falling in a range from 0.02 to 0.25 μm in arithmetic mean roughness.

9. A guide plate in accordance with claim 7, wherein said light scattering elements have sizes such that the light scattering elements are hard to be visible to the naked eye.

10. A surface light source device of side light type comprising:

a guide plate having a minor face to provide an incidence end face and two major faces to provide an emission face and a back face such that a first edge of the incidence end face abuts a first edge of the emission face along a first direction and the emission face has two substantially parallel edges extending away from the incidence end face in a second direction; and a primary light source providing primary light to the guide plate through the incidence end face, wherein said emission face is formed in a plane and has a plurality of light scattering elements distributed according to a predetermined pattern such that a covering density of said light scattering elements on the emission face decreases along the first direction according to a distance from each of the two substantially parallel edges, the light scattering elements being formed as projections out the plane of the emission face, said emission face having a rough area formed on and around said light scattering elements such that the light scattering elements and an area surrounding the light scattering elements are roughened and the projections out of the plane of the emission face have undulations, and said rough area having a roughness degree which is less than that of said light scattering elements.

11. A surface light source device of side light type comprising:

a guide plate having a minor face to provide an incidence end face and two major faces to provide an emission face and a back face such that a first edge of the incidence end face abuts a first edge of the emission face along a first direction and the emission face has two substantially parallel edges extending away from the incidence end face in a second direction; and a primary light source providing primary light to the guide plate through the incidence end face, wherein said emission face is provided with a plurality of column-shaped light scattering elements distributed according to a predetermined pattern such that a covering density of said light scattering elements on the emission face decreases along the first direction according to a distance from each of the two substantially parallel edges, said emission face having a rough area formed on and around said light scattering elements such that the light scattering elements and an area surrounding the light scattering elements are roughened, and said rough area having a roughness degree which is less than that of said light scattering elements.

* * * * *

UNITED STATES PATENT AND TRADEMARK OFFICE
CERTIFICATE OF CORRECTION

PATENT NO.       : 7,626,655 B2                                             Page 1 of 1
APPLICATION NO.  : 09/330016
DATED            : December 1, 2009
INVENTOR(S)      : Hiroshi Yamazaki et al.

It is certified that error appears in the above-identified patent and that said Letters Patent is hereby corrected as shown below:

Column 5, Line 20, before "returned" delete ".".

Column 5, Line 30, change "directively" to --directivity--.

Column 6, Line 26, change "smaller that" to --smaller than--.

Column 9, Lines 47-52, below "employed." delete "(g) In the above-described embodiment, a scattering guide plate provided with scattering power inside is employed as a guide plate with light scattering elements. This is, however, not limitative for the present invention. For instance, a guide plate made of transparent material having substantially no scattering power inside may be employed.".

Signed and Sealed this

Ninth Day of March, 2010

David J. Kappos
*Director of the United States Patent and Trademark Office*